Dec. 9, 1924.                                                              1,518,309
E. A. CRAWFORD ET AL
GATE
Filed Jan. 23, 1924                              2 Sheets-Sheet 2
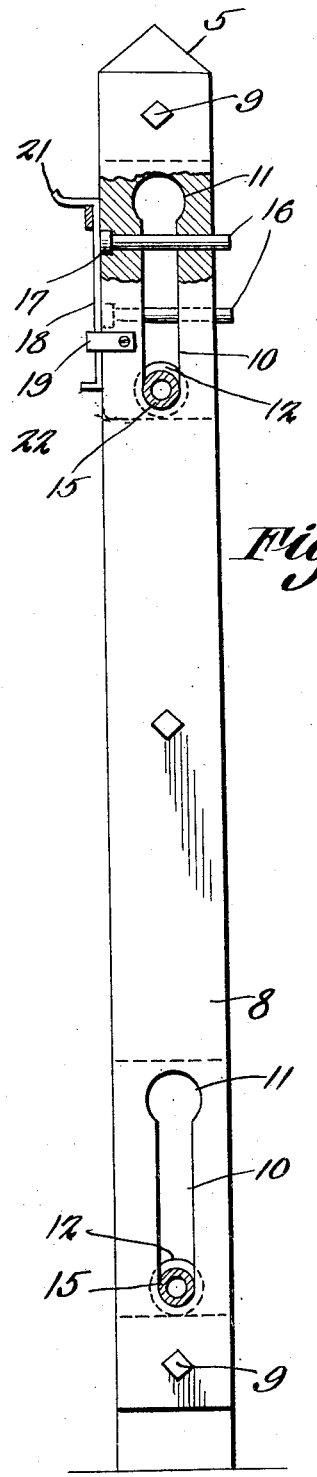
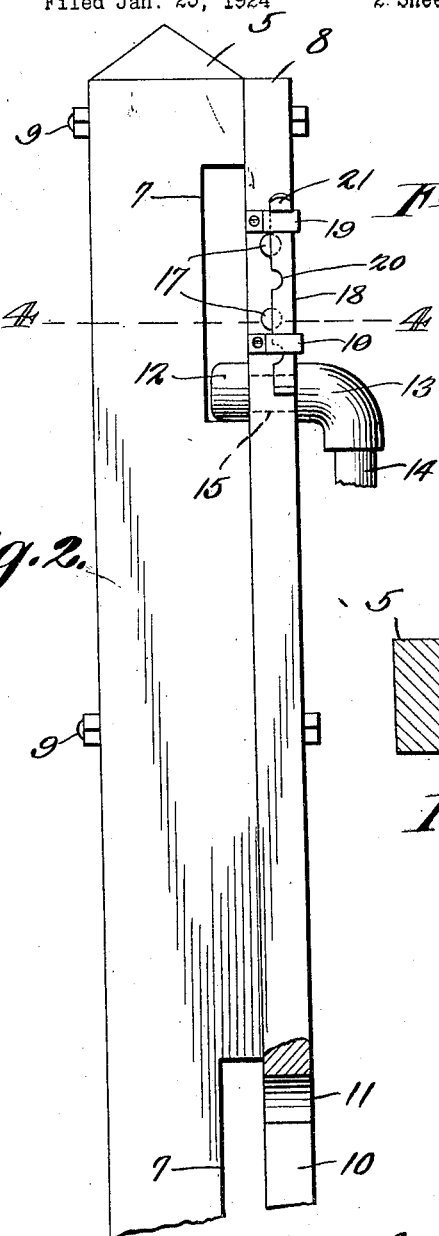
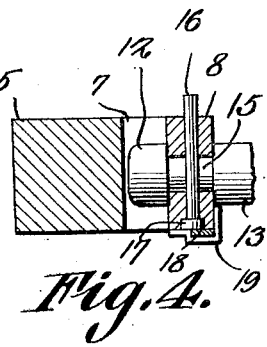
E. A. Crawford
M. B. Crawford
Inventors
By C. A. Snow & Co.
Attorneys Patented Dec. 9, 1924.

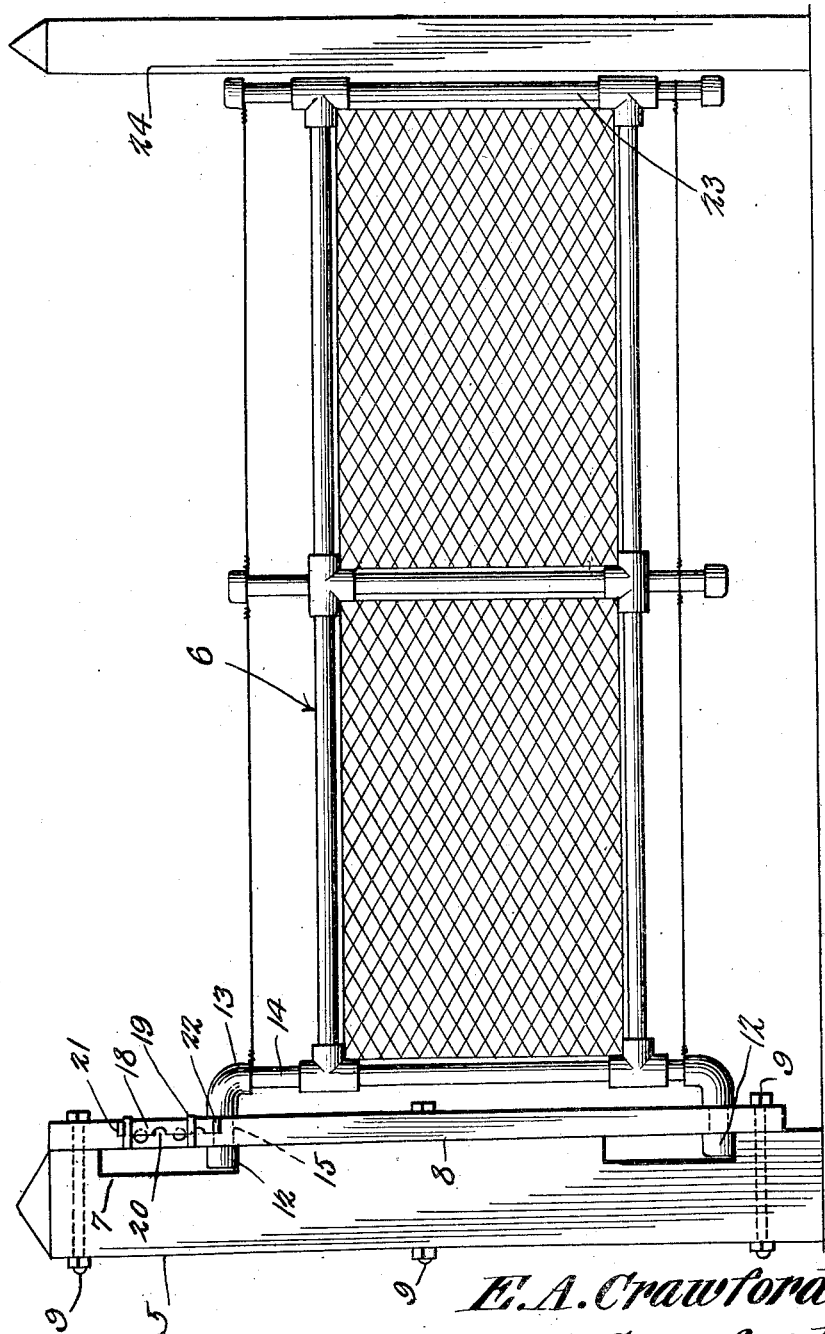

1,518,309

UNITED STATES PATENT OFFICE.

EPHRAIM A. CRAWFORD AND MARTHA B. CRAWFORD, OF CARTHAGE, MISSOURI.

GATE.

Application filed January 23, 1924. Serial No. 687,994.

*To all whom it may concern:*

Be it known that we, EPHRAIM A. CRAWFORD and MARTHA B. CRAWFORD, citizens of the United States, residing at Carthage, in the county of Jasper and State of Missouri, have invented a new and useful Gate, of which the following is a specification.

This invention relates to gate construction, and more particularly to gates commonly known as farm gates.

The primary object of the invention is to provide a gate of the steel tubular type, which may be readily and easily adjusted vertically to vary the distance between the lower horizontal member of the gate frame with respect to the surface over which the gate moves to allow smaller animals to pass under the gate, but exclude larger animals.

Another object of the invention is to provide a gate of this character which will be comparatively cheap to manufacture and one which may be erected by persons unfamiliar with mechanics.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a gate constructed in accordance with the invention.

Figure 2 is an elevational view disclosing the supporting post, a portion thereof being broken away to illustrate the securing bolts.

Figure 3 is a fragmental elevational view of the post.

Figure 4 is a sectional view taken on line 4—4 of Figure 3.

Referring to the drawings in detail, the reference character 5 designates the supporting post of the gate structure to which the gate proper indicated at 6 is hingedly connected.

The post 5 is formed with elongated cut out portions 7 disposed in one edge of the post, which cut out portions are covered by the vertical bar 8 that has connection with the post 5 through the medium of the bolts 9. Formed in the bar 8, are elongated openings 10 which are formed with enlargements 11 at their upper ends, the enlargements providing clearances for the heads 12 formed on the inner ends of the pipe sections 13 that provide bearings for the end tube 14 of the gate structure.

The pipe sections 13 are formed with reduced portions 15 designed to move within the elongated openings 10, the heads 12 thereof engaging the bar 8, at the rear edges thereof to hold the gate in its active position but at the same time allow the gate to be adjusted vertically with respect to the surface over which the same is moving.

Aligning openings are provided on opposite sides of the elongated openings, which aligning openings are designed to receive the supporting bolts 16 that are arranged in spaced vertical relation with each other, which bolts engage the under surfaces of the sections 13 when the gate proper is elevated so that the gate may be held in its adjusted positions.

The aligning openings are countersunk to accommodate the heads 17 of the bolts 16 so that the outer surfaces of the heads will lie flush with one edge of the post 5 and permit the locking plate 18 to be moved thereover. Bands 19 are arranged in spaced relation with each other and provide guides for the locking plate 18 which is formed with semi-circular cut out portions 20 adapted to register with the heads 17 providing clearances to allow the bolts to be moved from their openings when it is desired to make an adjustment of the gate.

A handle 21 is formed by bending the upper end of the locking plate at right angles, the lower end thereof being bent at right angles as at 22 to provide a stop and prevent the locking plate from being withdrawn from the guides. The gate also includes vertical pipe sections 23, disposed at its ends, the pipe section disposed adjacent to the post 5 having its ends pivotally supported within the sections 13 to allow the gate to be swung to its open or closed position.

The reference character 24 indicates a stop post which may be supplied with a suitable latch mechanism not shown for locking the gate in its closed position.

From the foregoing it will be obvious that should it be desired to elevate the gate to allow smaller animals to pass thereunder, the bolts 16 may be removed, and the gate lifted, whereupon the bolts may be replaced and the gate supported in its elevated position.

We claim:—

1. In a gate construction, a supporting post, a bar secured to the supporting post, said bar having elongated openings, a gate section, means forming a part of the gate section and disposed within the openings for supporting the gate section in its operative position, and means extending through the bar for contacting with that part of the gate section extending into the openings and supporting the gate section in adjusted relation with respect to the surface over which the gate moves.

2. In a gate construction, a supporting post having cut out portions, bars secured to the supporting post and adapted to overlie the cut out portions, said bars having elongated openings formed with enlargements at their upper ends, a gate section, pipe sections forming a part of the gate section, said pipe sections having heads, said pipe sections adapted to move in the elongated openings, and said heads adapted to engage behind the bar to support the gate sections, and means carried by the bar and adapted to engage the pipe sections for supporting the gate sections in various positions of adjustment longitudinally of the supporting post.

3. In a gate construction, a supporting post, a bar secured to the supporting post, said bar having elongated openings, a gate section including pipe sections, said pipe sections being disposed in the elongated openings, bolts extending transversely through the elongated opening and providing rests to engage the pipe sections to support the pipe sections in vertical spaced relation with the surface over which the gate moves, and means for locking the bolts against movement.

In testimony that we claim the foregoing as our own, we have hereto affixed our signatures.

EPHRAIM A. CRAWFORD.
MARTHA B. CRAWFORD.